United States Patent Office 3,558,415
Patented Jan. 26, 1971

3,558,415
GLASS WINDOW HAVING A COMPRESSIVELY
STRESSED OUTER GLASS SHEET
Raymond G. Rieser, Lower Burrell, and Joseph Chabal, Curtisville, Pa., assignors to PPG Industries, Inc., Pittsburgh, Pa., a corporation of Pennsylvania
Filed Jan. 13, 1969, Ser. No. 790,537
Int. Cl. B32b 1/00, 7/02, 17/10
U.S. Cl. 161—125                                    5 Claims

ABSTRACT OF THE DISCLOSURE

A laminated safety glass window having an outward facing glass ply chemically tempered to provide a surface compression stress zone extending inward between 50 and 500 microns in the direction of the glass sheet thickness and an inward facing glass ply of chemically tempered glass having surfaces provided with compression stress zones extending inward between 10 and 75 microns in said thickness direction. The compression stress zone of the outer glass ply is thicker than those of the inner glass ply.

---

Figure 1:
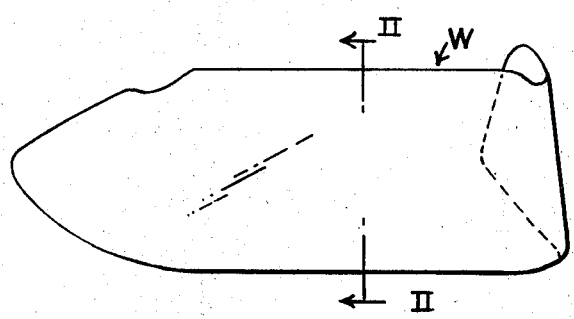

The present invention relates to laminated safety glass windows, particularly those used for vehicles, although such laminated articles may also be used in buildings.

Laminated glass is presently employed as glazing material in the windshields of automobiles, trucks, and other vehicles because it decreases the possibility that passengers carried in such vehicles will be seriously injured by the windshield or particles thereof if an accident occurs. Laminated glass comprises two or more glass sheets bonded together by an elastomeric interlayer material. Polyvinyl butyral is commonly used as the interlayer because it adheres to glass when subjected to suitable temperatures and pressure, because it is transparent when bonded between two glass sheets, and because it is resilient and elongates in response to impact against such a laminated article. Other interlayer materials employed more recently are polyurethane compositions, sometimes introduced as partial polymers and sometimes cast in place between a pair of glass sheets.

For purposes of descriptions the term "interlayer" is employed herein to describe an elastomeric material positioned between plies of glass, regardless of whether such material is initially positioned therebetween as a single sheet or layer of elastomer or as several sheets or as a layer of elastomer formed by casting a liquid resin between the glass sheets.

Laminated windshields offer two primary safety advantages. In the event of an accident, the bonding between the glass and the interlayer holds the glass particles in the same relative position to one another as the unbroken glass, thereby preventing the possibility of injury as the result of flying glass. Holding the glass particles in the same relative position also limits the possibility of having the jagged edges of broken glass exposed.

The other advantage is due to the physical properties of polyvinyl butyral and other elastomers such as the polyurethanes and the like. Unlike glass and other rigid materials, an elastomer stretches before it ruptures rather than break immediately when subjected to impact. On impact, an elastomer elongates, thereby absorbing energy from the impacting object and reducing the velocity of the impacting object. In many instances, the velocity of the impacting object can be reduced to zero before the object penetrates the windshield.

When polyvinyl butyral is employed as an interlayer between glass sheets, such a laminate retains some of the elastomeric properties of the polyvinyl butyral. Therefore, a windshield consisting of two sheets of glass bonded together by a polyvinyl butyral interlayer will elongate on impact in the emmediate area of impact, thereby absorbing energy from the impacting object and reducing its velocity. This property of a laminated windshield is referred to as penetration resistance.

Penetration resistance is particularly desirable in a windshield of an automobile because it serves to contain passengers within the vehicle when they are thrown against and fracture the windshield. Moreover, a polyvinyl butyral interlayer decreases the possibility of passengers being severely lacerated by "neck ruffle" resulting from partial penetration. "Neck ruffle" is used to describe the periphery of a jagged hole in a windshield resulting from penetration. In a conventional windshield the "neck ruffle" consists of a number of sharp and jagged edges inclined at such an angle that they are capable of inflicting severe lacerations. This "neck ruffle" could of course, inflict fatal wounds to a passenger of a vehicle who is thrown against the windshield with sufficient force to penetrate his face through the windshield and come to rest on the sharp and jagged glass edges.

The thickness of the interlayer is a factor in promoting resistance. Another factor that determines penetration resistance is the stress distribution throughout the thickness of the glass sheets comprising a laminated safety glass windshield.

The low strength of glass is usually attributed to minute surface flaws and to brittleness, which does not permit the glass to flow to relieve locally very high stresses in the vicinity of these flaws. Since the stress concentrating effect of the flaws comes into play in tension only, glass is weak in tension only. Its compressive strength is high and in the absence of gross manufacturing defects, fractures invariably originate from a surface in tension.

Tempering strengthens glass by compressively prestressing its surfaces. This compression of the surface layers is balanced by tension in the interior. While the tensile stresses thus created in the interior have no effect on the strength of the glass, their presence may have a far-reaching influence on the course of breakage once fracture has been initiated.

At present there are two types of glass strengthening processes used. They are thermal and chemical tempering.

In thermal tempering, the desired compressive stresses in the surface are obtained by rapidly chilling initially hot glass, so that its surfaces solidify and contract while its core is still relatively fluid. By the time the core has also set, its contraction is resisted by the already solid surface layers, which are thus put into compression while the core itself is put in tension. The stress distribution across the thickness of thermally tempered glass is characteristically parabolic. Typically, the regions of glass near the surfaces, to a depth of about $2/10$ of the total thickness, are in compression with a maximum value of the compressive stress at the surface of approximately 20,000 pounds per square inch. To balance this surface compression, the interior $6/10$ of the glass thickness is in tension, the maximum tension at the center of the glass thickness having a value of about one half the maximum surface compression.

Unlike annealed glass, which usually breaks into a few large, sharp-edged pieces, thermally tempered glass, when it does break, disintegrates into many small fragments, typically cubes having dimensions equal to the thickness of the glass and relatively blunt edges and corners. Both the size and shape of these fragments make them much less dangerous than fragments of annealed glass. The average particle size of tempered glass is probably related to the specific strain energy of the glass, i.e. the elastic energy stored in a unit volume of the prestressed material. This, in turn, depends primarily on the maximum stresses in the glass, since the parabolic shape of the stress distribution in thermally tempered glass is substantially independent of the level of stress.

Strengthening by chemical means, also called chemical tempering, though somewhat newer than the art of thermal tempering, is also well known. There are several mechanisms by which it may be accomplished. One of these entails ion exchange in the surface layers of the glass at a temperature approaching the strain point of the glass. In the ion exchange, relatively small ions, such as sodium, are replaced by larger ions, such as potassium, or smaller ions, such as lithium, are replaced by larger ions, such as sodium and/or potassium. The crowding of the larger ions into the spaces left by removal of the smaller ions produces a compression of the surface layers. Two other mechanisms for chemical tempering entail either ion exchange or partial crystallization, or both, at elevated temperatures, in such a manner that the modified surface layers of glass have a lower coefficient of expansion than the base glass. When an article thus treated is cooled to room temperature, the differential contraction of the surface and interior layers again produces compressive stresses in the surface.

Since diffusion is a relatively slow process, the effects of chemical tempering do not penetrate very deeply into the glass. This is reflected in the stress distribution in chemically tempered glass. In such glass, the compressive stress ranges from a relatively high level at the surfaces to zero at a depth of only a few thousandths of an inch below the surface. The rest of the interior of the glass sustains only a very low tensile stress, required to balance the compressive forces in the very thin layers near the surfaces. Thus, it may be seen that chemically tempered glass having the same surface compressive stress as thermally tempered glass may have much less interior tension stress and very much lower specific strain energy. Thus, while its strength in the absence of gross surface abrasions may be the same as that of thermally tempered glass, it does not have the same propensity to disintegrate when broken. This may be an advantage in some applications, as will be considered below. It is usually considered a disadvantage in automotive applications where the small size of fragments is as important as the enhancement of strength. To make for such fine fragmentation, one can raise the surface compressive strength or increase the thickness of the compressed layers, or do both, in order to raise the specific strain energy of the glass to the level at which the particle size of its fragments may be comparable with that of glass thermally tempered to give a surface compression of about 20,000 pounds per square inch. Indeed, the usual chemically tempered glass intended for automotive applications is made to have surface compressive stresses of the order of 80,000 pounds per square inch.

Comparing thermally and chemically tempered glass, the former has the advantage that the greater thickness of the compressive layers on its surface gives it more abrasion resistance. Chemically tempered glass has the advantage of more readily permitting the attainment of much higher temper stresses, and, therefore, higher strengths. In addition, it has the advantage that the thickness of the compressive layer, and with it the specific strain energy of the material, may be varied at will, permitting the fracture pattern of chemically tempered glass to be controlled independently of its strength.

It is also well known to chemically temper glass that has been previously thermally tempered. This combination of tempering steps places a higher compression stress in the surface of the glass to a lesser depth than the depth of the compression zone produced by thermal tempering, thereby resulting in a stronger glass article than one produced by thermal tempering alone.

According to a typical operation, increased impact resistance, breaking stress and penetration resistance are secured in glass by chemical tempering. In a typical example with an alkali silica glass, for example, soda lime silica glass, a glass sheet is contacted with a potassium salt at a selected temperature range, preferably above 875 degrees Fahrenheit and below the strain point of the glass, for sufficient time for an exchange to take place in the surface zone of the glass. Preferably, the glass sheet is immersed in a molten bath of a potassium salt, preferably potassium nitrate. During immersion, an exchange takes place wherein potassium from the potassium bath is introduced into the glass surface, apparently in exchange for sodium present in the exterior or surface zone of the glass sheet. It is believed that chemical tempering of soda-lime-silica glass is an ion exchange phenomenon wherein potassium ions are exchanged for sodium ions.

Other glass compositions may be chemically tempered by immersion in alkali metal salt baths. For example, an alkali silica glass containing lithium may be advantageously chemically tempered by immersion in a molten bath of a sodium salt or a potassium salt or a mixture thereof at an elevated temperature approaching the strain point of the glass. It is also possible to provide a multiple step chemical tempering operation in which a lithium containing glass has its lithium ions exchanged for sodium ions, which, subsequently, are exchanged for potassium ions in a second immersion wherein the sodium enriched surface zone produced by the first ion exchange operation becomes a potassium enriched surface zone during the second immersion.

After treating the glass composition as recited in the chemical tempering operations described above, the chemical nature of the alkali metal oxide constituents of the surface zone of the glass article is altered radically with replacement of lithium by sodium and/or potassium or sodium by potassium, depending upon the initial glass composition. At the same time the central interior regions of the glass article contain substantially the same concentration of alkali metal as before the treatment.

At lower temperatures the effect of such contact with a molten metal salt is much slower with the result that chemically tempered glass articles are difficult to achieve within the periods of time which are commercially practicable. For example, an immersion of soda-lime-silica glass for one hour in molten potassium nitrate at 700 degrees Fahrenheit does not improve the strength properties of the glass substantially. Much longer periods of immersion at this temperature are required to produce strength compressibility to that achieved in the minimal time periods (5 to 10 minutes) at higher temperatures. At temperatures exceeding 870 degrees Fahrenheit, the desired strength improvement occurs even more rapidly.

The upper limit of the contact temperature depends upon the softening temperature and melting temperature of the glass article under treatment. The contact temperature cannot exceed the melting temperature of the glass composition but it can exceed the strain point and even the softening point of the glass composition under certain circumstances. For example, as long as the glass can be supported properly, the contact temperature can be maintained even at a temperature above the softening temperature of the glass provided the contact at these elevated temperatures is of sufficiently short duration to avoid thermal relaxation of the ion exchange induced strength characteristics. In fact, in some cases it is possible to maintain the contact temperature within the softening temperature range of the particular glass article undergoing treatment. Under these thermal conditions, extremely short contact times can be employed such as on the order of one minute or less.

The depth or thickness of the surface zone of compression depends upon the temperature and the duration of the chemical tempering treatment.

U.S. Pat. 3,396,079 to John W. Morris discloses and claims a laminated safety glass windshield comprising a pair of glass sheets, at least one of which is chemically tempered, adhered together by an interlayer of elastomeric plastic. The present invention provides a further improvement in laminated safety glass windshields wherein the outward facing surface of an outer sheet of glass has a deeper compressively stressed surface zone between 50 and 500 microns thick and the inner sheet of glass facing the interior of the enclosure in which the article is installed has shallower compressively stressed surface zones having a thickness between 10 and 75 microns.

The compression stress zones of the outer glass sheet, by virtue of its minimum depth of 50 microns, is capable of resisting road stone impacts and yet does not become opaque like thermally tempered glass if the outward facing glass sheet of the laminated windshield is fractured by a small object such as a stone, or a large missile such as a head, bird, brick or the like. Furthermore, if the head of a vehicle occupant impacts the inner surface of the windshield, the mechanical tension stress applied to the outward facing surface of the outer glass sheet as the latter flexes convexly in response to said impact is sufficient to overcome the compression stress imposed in the outer surface by chemical tempering. Hence, it is more likely that the outer glass sheet will break when impacted from within by a human head or other object rather than resist fracture and cause whiplash.

The inner glass sheet, having shallower compressive stress zones than the outer glass sheet, has less resistance to breakage than the outer glass sheet. However, since a human head is relatively blunt compared to objects likely to strike the outer glass sheet, the impact force on the inner glass sheet is spread over a larger area than is the case with the outer glass sheet. Therefore, the inner glass sheet need not be strengthened by chemical tempering to the extent required for the outer glass sheet. This enables the inner glass sheet to fracture readily into relatively harmless fragments once the blunt impact force is sufficient to initiate fracture of the inner glass sheet.

An additional safety factor results when windshields are composed of glass sheets substantially thinner than the conventional thickness of glass sheets presently used in automobile windshields (nominal thickness of ⅛ inch). For example, when the chemically tempered glass sheets have a thickness of .050 inch to .070 inch, the fractured inner glass sheet has a much less harmful lacerative effect on an impacting head because its relative thinness causes less damage than a jagged fragment of a thicker sheet of more conventional thickness.

If the interlayer material is plasticized polyvinyl buytral having a thickness of .030 inch to .060 inch, its yield on impact is considerably better than that of an interlayer of the type previously used commercially having a thickness of .015 inch. The combination of thicknesses providing a ratio of glass ply thickness to interlayer ply thickness ranging from 0.8 to 3, wherein the interlayer has a minimum thickness of .030 inch and a maximum thickness of .060 inch, produces a windshield of optimum safety when both glass sheets are chemically tempered to provide compressive stress zones of the thickness ranges indicated. If the thickness of the plastic interlayer used in windshields is less than .030 inch, the possibility of "neck ruffle" increases, particularly when using glass in thicknesses employed presently in a conventional windshield.

The principal purpose of the present invention is to provide a laminated safety glass windshield. The present invention accomplishes this by arranging a pair of chemically tempered glass sheets in such an arrangement that the outward facing glass sheet has an outward facing surface zone stressed in compression to a deeper depth between 50 and 500 microns and the surfaces of the inner sheet of glass facing the interior of the enclosure in which the windshield is installed have shallower compression stress zones between 10 and 75 microns thick. It is understood that the term "chemical tempering" as used herein is intended to cover partial crystallization, ion exchange, multiple ion exchange and a combination of tempering steps combining thermal tempering with chemical tempering, all of which have been described above.

Figure 2:
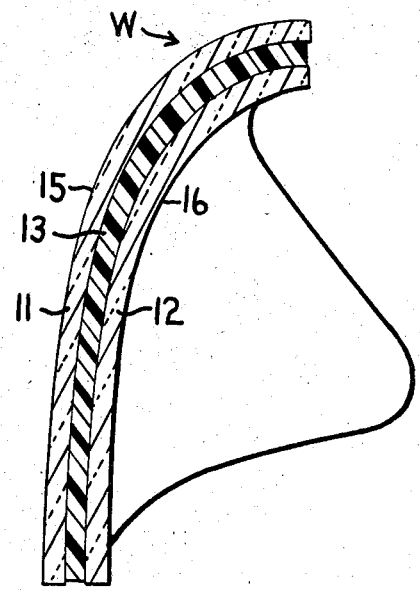

The present invention will be understood more clearly after the reader has had an opportunity to study a description of an illustrative embodiment that follows. In the drawings which form part of the aforesaid description and wherein like reference numbers refer to like structural elements, FIG. 1 is a schematic plan view of a windshield;

FIG. 2 is a cross sectional view of the windshield of FIG. 1 taken along the lines of II—II.

The drawings show a curved laminated windshield W having an outer, chemically tempered, glass sheet 11 and an inner, chemically tempered, glass sheet 12 bonded together by a matching sheet 13 of elastomeric material such as polyvinyl butyral. The outward facing surface 15 is convexly curved and the inner surface 16 of the inner glass sheet 12 that faces the interior of an enclosure in which the windshield W is installed has a concave shape. Surface 15 of outward facing glass sheet 11 has a surface zone stressed in compression that extends from 50 to 500 microns into the depth of the outward facing sheet 11. The opposite surfaces of the inward facing sheet 12 have surface zones stressed in compression that extends into the depth of the sheet between 10 and 75 microns. If desired, the interlayer-facing surface of the glass sheet 11 as well as the peripheral edge surfaces of both sheets may be provided with compressive stress zones equal in thickness to those of the surface zones 15 and 16 of the respective sheets 11 and 12. Glass sheets 11 and 12 preferably have a nominal thickness of .050 inch and the plastic interlayer 13 a preferred thickness of .045 inch, although the present invention envisions windshields having glass sheets chemically tempered to different degrees of temper as described herein with the thickness of the inner glass sheet ranging between .040 and .090 inch, the outer glass sheet between .040 and .130 inch and the interlayer between .030 and .060 inch.

The relatively thick stress zone in the outward facing surface zone 15 of the outer glass sheet 11 provides sufficient protection against impact by road objects. The interlayer flexes in response to impact by most road objects. The thin compressive stress zone at the inward facing surface zone 16 of the inner glass sheet 12 provides sufficient compressive stress to prevent the tension stress induced in the inner sheet 12 when an object impacts against the outer glass sheet 11 from overcoming the compression stress established by chemical tempering.

When an accident occurs causing an occupant of a vehicle to strike the inward facing surface 16 of the inner glass sheet 12, the thin compressive stress zone in the surface zone 16 of the inner sheet 12 does not fracture readily on low velocity impact because the head of a vehicle occupant is relatively blunt compared to sharp penetrating objects such as stones and birds that may impact the outer glass sheet 11. Once the blunt impact force is sufficient to initiate fracture, the fracture is readily propagated to form relatively harmless fragments.

The present invention permits the use of commercial soda-lime-silica glass such as glasses having the following composition:

| | Percent by weight |
|---|---|
| $Na_2O$ | 10–15 |
| $K_2O$ | 0–5 |
| CaO | 5–15 |
| $SiO_2$ | 65–75 |
| MgO | 0–10 |
| $B_2O_3$ | 0–5 |

A typical soda-lime-silica glass suitable for use in accordance with this invention has the following composition:

| | Percent by weight |
|---|---|
| SiO | 71.38 (usual variation 71 to 74%). |
| $Na_2O$ | 12.76 (usual variation 12 to 14%). |
| $K_2O$ | 0.03 (usual variation 0 to 1%). |
| CaO | 9.67 (usual variation 8 to 12%). |
| MgO | 4.33 (usual variation 2 to 5%). |
| $Na_2SO$ | 0.75 (usual variation 0.1 to 1.0%). |
| $Fe_2O_3$ | 0.15 (usual variation 0.1 to 1.0%). |
| $Al_2O_3$ | 0.81 (usual variation 0.1 to 1.0%). |

The outer glass sheet 11 is provided with a compression stress zone at least 50 microns thick by immersion for six hours in potassium nitrate at 900 degrees Fahrenheit. The inner glass sheet develops compression zones 10 microns thick after 30 minutes immersion in potassium nitrate at 900 degrees Fahrenheit.

To produce bent, laminated windshields, a pair of glass sheets of matching outline are mounted on each of a series of bending molds of concave elevation with a suitable parting material between the glass sheets. The molds are conveyed through an elongated tunnel where the glass is heated to bending temperature to sag the sheets to the shape of the mold. The bent sheets are cooled at a controlled rate until the glass sheets are cool enough for handling. The bent sheets are separated with the upper sheet of each pair bent to concave elevation subjected to a chemical tempering of sufficient duration to produce surface compression stress zones having a thickness of about 20 microns. The lower sheet of each pair is subjected to a chemical tempering of sufficient duration to produce a surface compression stress zone having a minimum thickness of about 100 microns.

The chemically strengthened glass sheets are then ready for lamination. When laminated to a plasticized polyvinyl butyral interlayer, a sadwich is assembled having one of the upper sheets of the bent pair is disposed on one side of the interlayer to form a concave outer surface of the sandwich and one of the lower sheets of the bent pair is disposed on the other side of the interlayer to form a convex outer surface of the sandwich.

The laminating is conducted in two stages. The first stage, viz., prepressing, is performed using rubber tubing edge channels as described in Keim. U.S. Patent 2,948,645. The matching pairs of bent lights are assembled with the interlayer therebetween to form sandwich structures. The tubing is then fitted around the edge periphery of each sandwich and connected to a vacuum source. The prepressing is performed at a temperature of 300 degrees Fahrenheit for 13 minutes using a vacuum of 26–29 inches of mercury.

The prepressed windshield samples are then autoclaved in an oil autoclave for 45 minutes at 275 degrees Fahrenheit using 200 pounds per square inch autoclaving pressure. Following the autoclaving the laminated windshields are allowed to cool to room temperature.

The form of the invention shown and described in this disclosure represents an illustrative embodiment thereof. It is understood that various changes may be made without departing from the spirit of the invention as defined in the claimed subject matter that follows. For example, the technique for imparting compression stress zones of different depth to the sheets to be laminated may involve immersing the sheets of each pair for substantially the same duration in ion exchange baths maintained at different temperatures or in baths of different compositions having different rates of reaction with the glass composition or in any combination of two or more of these techniques. Furthermore, the glass bending operation may be omitted if a flat glass laminate is required or the glass sheets may be shaped by press bending instead of gravity sagging. In addition, lamination may involve the use of rolls instead of evacuation tubes for prepressing and/or any other well known laminating operation such as an air autoclave instead of the oil autoclave described above. In other words, any combination of well known techniques may be used to shape and chemically temper the sheets as well as to laminate them without departing from the spirit of the present invention as long as the laminated window produced has an outward facing surface with a deeper compression stress zone than the surfaces of the inner glass sheet of the installed window.

What is claimed is:

1. In a laminated safety glass window comprising an outer sheet of glass, an inner sheet of glass and an interlayer of elastomeric material, wherein said sheets of glass are chemically tempered to have a surface zone stressed in compression, the improvement wherein the outward facing surface of said outer sheet of glass has a compressively stressed surface zone between 50 and 500 microns thick and the surfaces of said inner sheet of glass facing the interior of the enclosure in which the window is installed have compressively stressed surface zones having a thickness between 10 and 75 microns, the thickness of the compression zone in said outer sheet of glass being greater than the thickness of either of said compression zones in said inner glass sheet.

2. The improvement as in claim 1, wherein said laminated window is curved and said outer glass sheet has a convex surface facing away from said interlayer and said inner glass sheet has a concave surface facing away from said interlayer.

3. The improvement as in claim 1, wherein said sheets of glass are composed of alkali silica glass having a greater concentration of alkali metal ions of larger atomic diameter and a lesser concentration of alkali metal ions of smaller atomic diameter in said compressively stressed surface zones than in the interior portions of said glass sheets.

4. The improvement as in claim 1, wherein said outer sheet of glass is both thermally tempered and chemically tempered.

5. The improvement as in claim 1, wherein said outer sheet of glass has a thickness between .040 and .130 inch, said inner sheet of glass has a thickness between .040 and .090 inch, and said interlayer has a thickness between .030 and .060 inch.

References Cited
UNITED STATES PATENTS

| | | | |
|---|---|---|---|
| 2,374,040 | 4/1945 | Ryan | 156—106 |
| 2,827,739 | 3/1958 | Atkeson | 156—106X |
| 2,946,711 | 7/1960 | Bragaw, Jr. et al. | 156—106 |
| 3,282,772 | 11/1966 | Davis, Sr. | 161—165 |
| 3,287,200 | 11/1966 | Hess et al. | 161—1 |
| 3,287,201 | 11/1966 | Chisholm | 161—1 |
| 3,396,075 | 8/1968 | Morris | 161—199 |
| 3,473,997 | 10/1969 | Howitt | 161—199 |

JOHN T. GOOLKASIAN, Primary Examiner

D. J. FRITSCH, Assistant Examiner

U.S. Cl. X.R.

161—164, 165, 166, 199; 156—106